United States Patent [19]

Chaffiotte

[11] Patent Number: 4,467,606
[45] Date of Patent: Aug. 28, 1984

[54] TURBO-COMPRESSOR SUPERCHARGER DEVICE FOR INTERNAL COMBUSTION ENGINE

[75] Inventor: Pierre Chaffiotte, Saint Cloud, France

[73] Assignee: Regie Nationale des Usines Renault, Boulogne-Billancourt, France

[21] Appl. No.: 326,210

[22] Filed: Dec. 1, 1981

[30] Foreign Application Priority Data

Dec. 2, 1980 [FR] France .................. 80 25577
Jan. 20, 1981 [FR] France .................. 81 01004
May 5, 1981 [FR] France .................. 81 08929

[51] Int. Cl.³ .................................... F02B 37/00
[52] U.S. Cl. ......................................... 60/602
[58] Field of Search ............... 60/600, 601, 602, 603

[56] References Cited

U.S. PATENT DOCUMENTS

| | | | |
|---|---|---|---|
| 2,621,472 | 12/1952 | Udale | 60/600 |
| 3,233,403 | 2/1966 | MacInnes | |
| 4,197,711 | 4/1980 | Fuhrmann | 60/602 |
| 4,203,296 | 5/1980 | Tanaka et al. | |
| 4,248,047 | 2/1981 | Sumi | 60/602 |
| 4,271,672 | 6/1981 | Withalm | 60/602 |
| 4,373,335 | 2/1983 | Kuribayashi | 60/602 |

FOREIGN PATENT DOCUMENTS

| | | |
|---|---|---|
| 2823255 | 12/1979 | Fed. Rep. of Germany . |
| 2369423 | 10/1977 | France . |
| 2392230 | 5/1978 | France . |
| 2446923 | 1/1979 | France . |
| 2039610 | 8/1980 | United Kingdom . |

OTHER PUBLICATIONS

Automotive Engineering, vol. 88, No. 6, Jun. 1980, New York, "Turbo Boost Controlled by Knock Detection", pp. 70–73.

Primary Examiner—Douglas Hart
Attorney, Agent, or Firm—Oblon, Fisher, Spivak, McClelland & Maier

[57] ABSTRACT

In this supercharging device for internal combustion engines, comprising a turbine driven by the engine exhaust gases, an air compressor driven by the turbine and connected to the engine intake manifold, and a so-called exhaust-gas waste-gate responsive to a valve control valve responsive in turn to the compressor output pressure, this control valve being also responsive to a pilot valve responsive to the detection of the engine intake governing the valve control when opening the waste-gate at low engine speeds and part-load engine operating conditions, and when closing the waste-gate at higher engine speeds, the portion of the valve control which is responsive to the compressor output pressure being connected to a venting member actuated gradually from a position of maximum opening of the intake control butterfly valve obtained during the stroke controlling the maximum engine power output, whereby in the portion of this stroke which follows the position corresponding to the fully-open position of the butterfly valve the actual power output is subordinate to the closing of the waste-gate as a function of the degree of actuation of the venting member.

14 Claims, 5 Drawing Figures

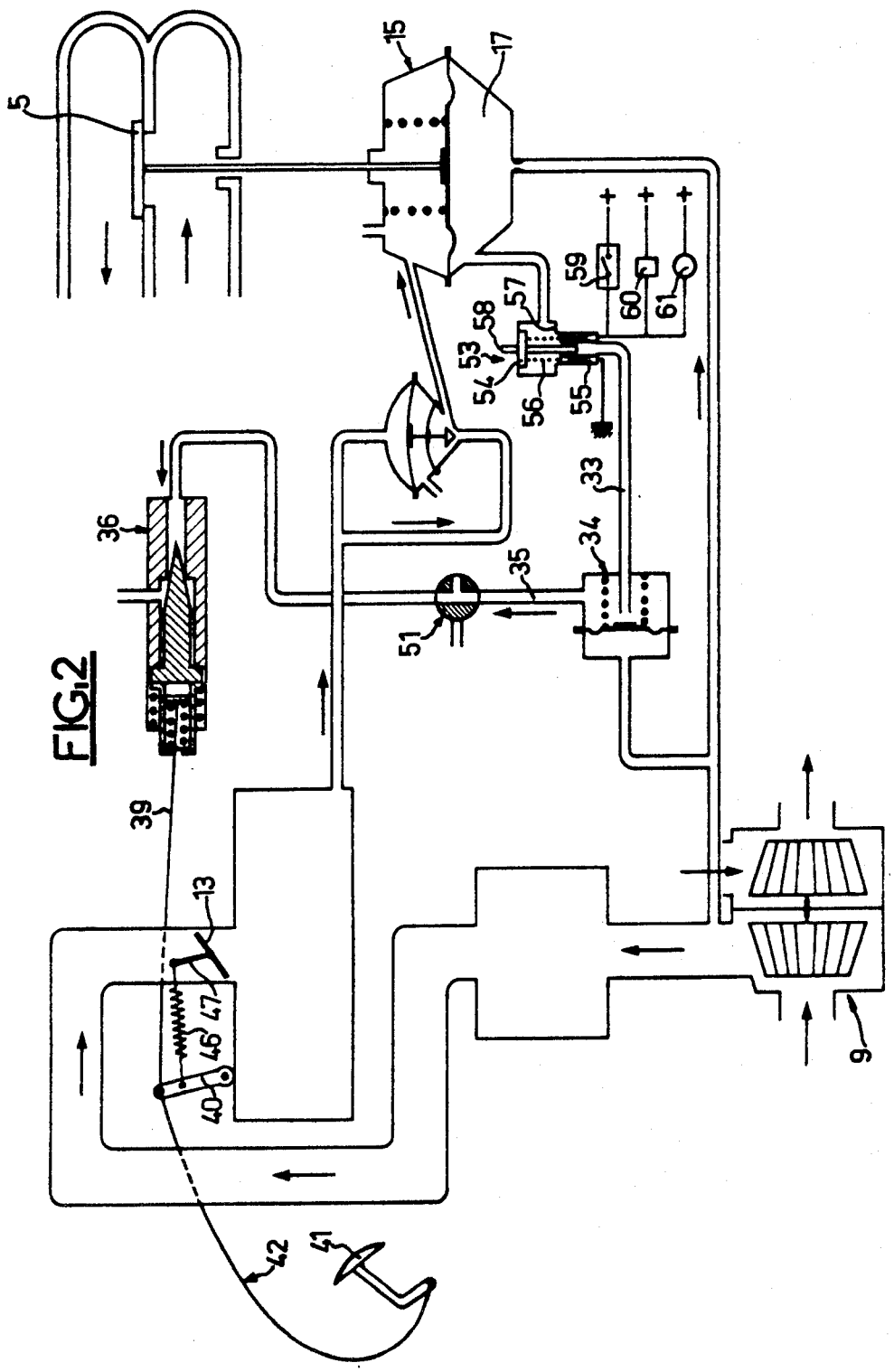

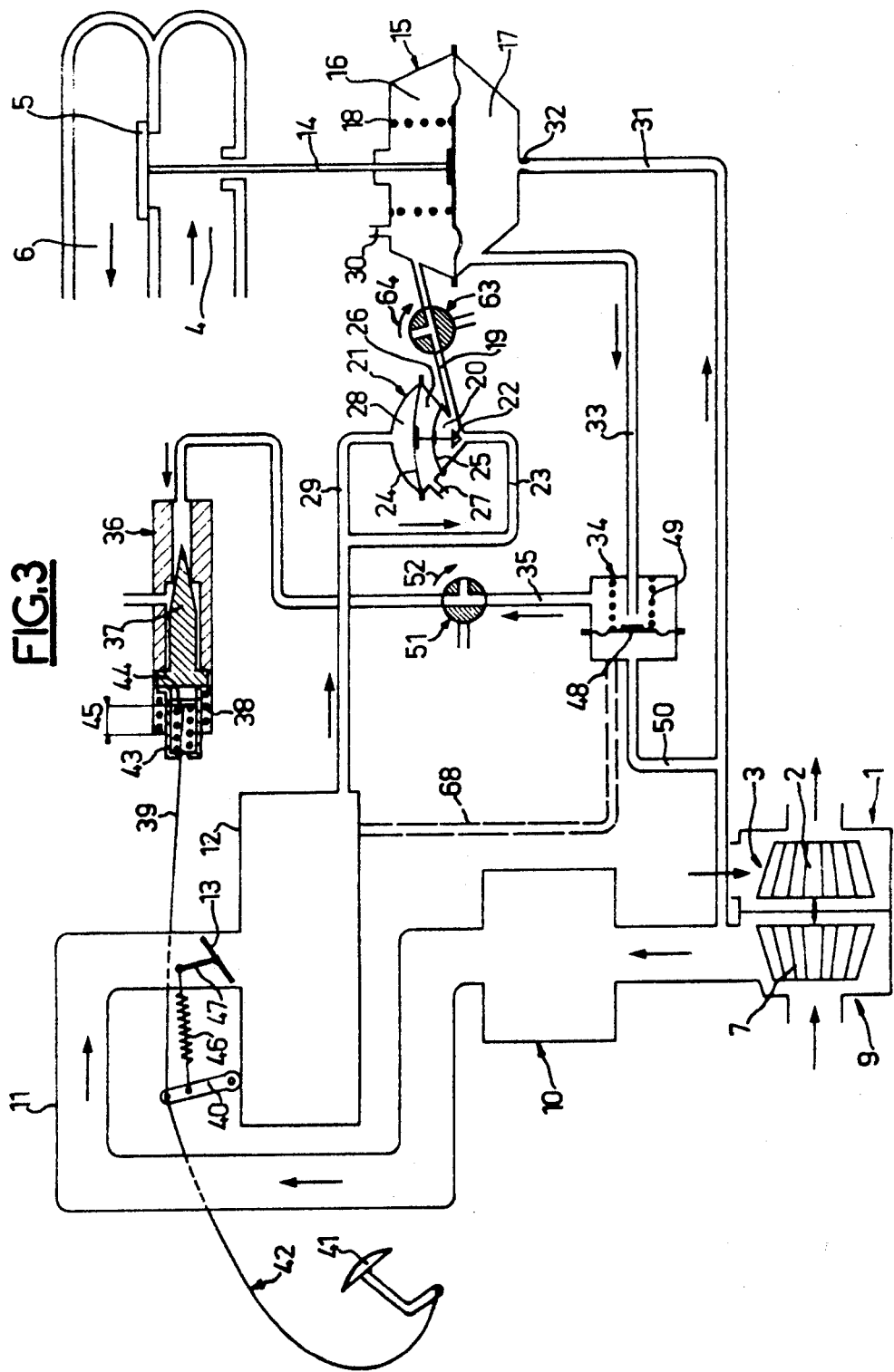

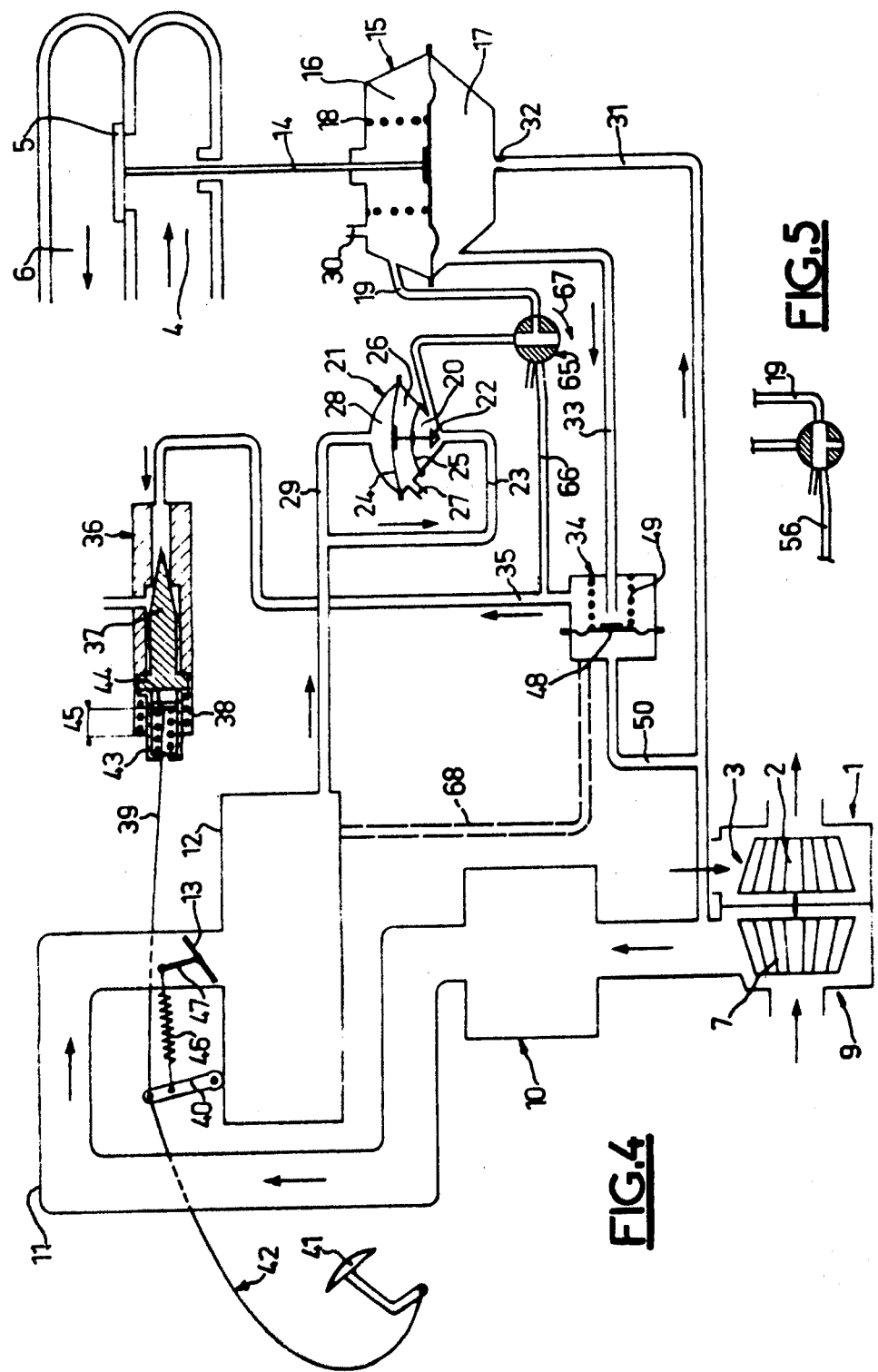

TURBO-COMPRESSOR SUPERCHARGER DEVICE FOR INTERNAL COMBUSTION ENGINE

BACKGROUND OF THE INVENTION

1. Field of the Invention

This invention relates to a supercharging device for internal combustion engines which incorporates a turbo-compressor driven by the engine exhaust gases.

2. Description of the Prior Art

It is known that when a turbo-compressor or turbocharger is used a back-pressure develops in the engine exhaust system. A far from negligible consequence of this back-pressure is a substantial increase in the fuel consumption. Thus, by eliminating or at least minimizing this back-pressure it is possible to reduce the fuel consumption, in certain cases by as much as ten percent. It is also known that the primary object of the present use of an exhaust gas by-pass, usually referred to as a "waste-gate", actuated by a control valve responsive to the supercharger output pressure, is to limit the intake supercharging pressure to a predetermined threshold, for the obvious purpose of protecting the engine.

More particularly, the present invention is based on the advantage derived from controlling the opening and closing of the above-defined exhaust-gas waste-gate as a function of engine power demands. In fact, at low r.p.m. values and under part-load engine operation a certain degree of supercharging is necessary and consequently the waste-gate can be opened to reduce the exhaust back-pressure and therefore improve the fuel consumption. At higher engine speeds said waste-gate can be gradually closed according to power requirements. In this mode of operation, the exhaust back-pressure is lower than in the conventional use of the waste-gate, the latter opening only at one engine protection value, and nevertheless a fuel consumption gain will still result.

SUMMARY OF THE INVENTION

The present invention is directed to provide a relatively simple and economical device capable of advantageously meeting the above-mentioned requirements. Basically, for this purpose the turbo-compressor supercharging device according to the instant invention for an internal combustion engine, includes a turbine driven by the engine exhaust gas, an air compressor driven by said turbine and coupled to the engine intake manifold, and an exhaust gas waste-gate responsive to a valve control responsive in turn to the compressor output pressure. The valve control is, on the other hand, controlled by a pilot valve responsive to the engine intake negative pressure governing valve control when the waste-gate opens under low-speeds and part-load engine conditions and closes at higher engine speeds, and that the valve control portion responsive to the compressor output pressure is operatively connected to a venting member controlling the release to the surrounding atmosphere which is gradually actuated from a position corresponding to the full-throttle position of the engine induction butterfly as obtained during the full-power control stroke, so that during the portion of said stroke which follows the fully-open butterfly position the power output is a function of the action directed to close the waste-gate which depends on the degree of closing of said venting member.

However, these arrangements cannot prevent the quick closing of the waste-gate in order to obtain the maximum engine power output when the fully depresses the accelerator pedal of the vehicle (kick down). Such arrangements are useful to reduce the induction throttling phase by means of the butterfly valve which is fully open in only one fraction of the desired power control stroke produced by depressing a conventional accelerator pedal, and this is adequate for a relative increment in the supercharging and a relative reduction of the counterpressure, a feature advantageous for reducing the engine fuel consumption in comparison with the use of an accelerator pedal of which the entire stroke is utilized as customary for moving the intake butterfly valve to its fully open position. Moreover, in the supercharging device according to this invention there is interposed, in the means interconnecting the valve control portion responsive to the compressor output pressure and said venting member, a valve for closing said interconnecting means which is responsive to a maximum predetermined output pressure of said compressor so that said valve control will react to the closing of said interconnecting means by opening the waste-gate to prevent the supercharging pressure from overstepping a predetermined safety value.

It will also be seen presently that with the relatively economical driving afforded by the device of this invention, which is operative more particularly when the vehicle is driven at cruising speeds, it is possible to introduce easily and at will a high supercharging (attended of course by a higher fuel consumption) when it is desired to obtain higher performances. It will be seen more particularly that the device of this invention also lends itself to the closing of the waste-gate even under low-load conditions in order to provide a higher degree of supercharging when the driver wishes to drive the vehicle like a sports car, without regard for a reduced fuel consumption.

Another feature of the device constituting the subject-matter of this invention is that it is capable of preventing in a particularly simple manner any detectable abnormal operation of the supercharged internal combustion engine which may occur when the vehicle is driven at high engine speeds, thus safely preventing any damage likely to result from this excessive driving.

BRIEF DESCRIPTION OF THE DRAWINGS

Various forms of embodiment of a supercharging device according to this invention will now be described by way of example with reference to the accompanying drawings, in which similar component elements are designated by the same reference numerals.

FIG. 2 is a similar view of the device but provided with a system for checking any abnormal engine operation;

FIG. 3 is a diagrammatic view showing the main component elements of a first modified embodiment of the supercharging device of FIG. 1;

FIG. 4 is a similar view of another modified embodiment, and

FIG. 5 illustrates a controlled position for obtaining a higher degree of supercharging through the complementary valve of the modified version of FIG. 4.

DESCRIPTION OF THE PREFERRED EMBODIMENTS

Figure 1:
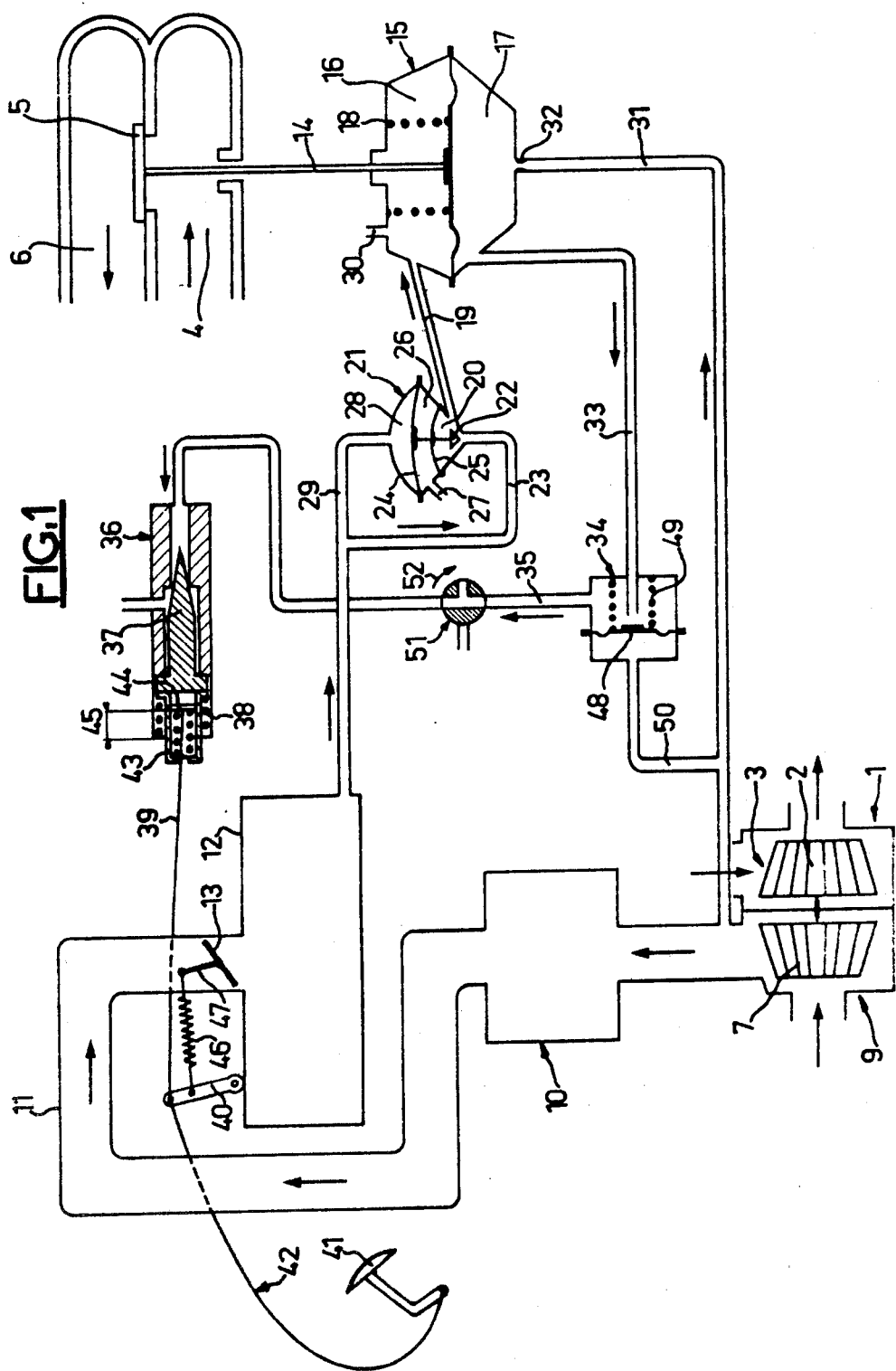
FIG. 1 is a diagrammatic comprehensive view of the device.

The engine supercharging device illustrated in FIG. 1 comprises a turbo-compressor designated in general by the reference numeral 1, which consists essentially of a turbine 2 driven by the engine exhaust gases delivered thereto in the direction of the arrow 3 from an outlet passage 4 of the exhaust manifold (shown only diagrammatically and partially in the Figure) in which a waste gate or like by-pass valve 5 for controlling the release of exhaust gases to the atmosphere is mounted, this gate or valve 5 opening into an adjacent outlet passage 6 also shown only partially.

The turbo-compressor further comprises an air turbine 7 rigidly coupled to the exhaust gas turbine 2 and constituting the impeller or operative member of an air compressor 9 coupled to an air-to-air heat exchanger 10 for cooling the air subsequently directed via a pipe 11 to the engine induction manifold 12.

Incorporated in pipe 11 upstream of manifold 12 is a power-regulating butterfly valve 13 which may preferably constitute an air induction control butterfly valve in the specific case of a fuel-injection engine, or a air-fuel mixture adjustment butterfly valve when a carburetor is interposed between said pipe 11 and manifold 12.

The waste-gate 5 is coupled via a rod 14 to the diaphragm of a valve control 15 comprising two chambers 16 and 17 disposed on either side of said diaphragm.

One chamber 16 encloses a coil compression spring 18 constantly urging the waste-gate or valve 5 to its closed position. This chamber 16 is connected through a pipe line 19 to one chamber 20 of a pilot valve 21 comprising another chamber 28. A valve member 22 is adapted to open or close the communication between said pipe line 19 and another pipe line 23 connected to the induction manifold.

This pilot valve 21 comprises two diaphragms 24, 25 carrying said valve member 22 and forming between them a chamber 26 provided with a vent hole 27 to the atmosphere. The first diaphragm 24 has a greater surface area than diaphragm 25 and forms in the valve body 21 a chamber 28 connected via a pipe line 29 to pipe line 23 leading to the induction manifold.

Therefore, this monitoring valve operates as a differential valve according to the magnitude of the pressure prevailing in the induction manifold 12 with respect to the atmospheric pressure; in other words, a negative pressure in the manifold will open valve member 22 and a positive pressure in said manifold, i.e. above the atmospheric value, will close this valve member.

Furthermore, chamber 16 is constantly connected to the external atmosphere through a vent orifice 30. The other chamber 17 of control valve control 15 is connected to the output of compressor 9 via a pipe line 31 having a gaged throttled passage 32 formed at the inlet of chamber 17. This chamber 17 is also connected via a pipe line 33 to a normally open valve member 34 and via another pipe line 35 constituting the extension of line 33 to a controlled vent valve 36 comprising a needle valve 37 normally closed by a compression coil spring 38 operatively connected to the driver-operated engine power output control means.

In this example the last-named control means is operable by means of a flexible cable 39 attached to a pivoted lever 40 operatively connected via another flexible transmission means shown diagrammatically at 42 to the vehicle accelerator pedal 41. The flexible cable 39 is connected through a lost-motion device for example in the form of a spring 43 to needle valve 37, this spring being housed in a rear hollow portion of valve 37 and adapted to be compressed before an end section 44 of cable 39 begins to open said valve.

The lost motion 45 provided by the means controlling said valve 37 is such that it corresponds substantially to the stroke controlling the full-throttle position of butterfly valve 13 obtained by actuating the throttle pedal 41 and pivoting the lever 40 through the medium of a spring 46 connecting this lever 40 to another lever 47 rigid with the pivot trunnions of butterfly valve 13. With this spring 46 it is thus possible to depress the throttle pedal 41 beyond the position corresponding to the fully open position of butterfly valve 13 so as to gradually open valve member 37 of vent valve 36 while compressing the return spring 38 thereof.

The above-described supercharging device operates as follows:

At low engine rotational speeds and under part-load engine conditions the intake manifold 12 is subjected to a negative pressure with respect to the atmospheric pressure. The valve member 22 of pilot valve device 21 is open and the vent orifice 30 is relatively small (for example of the order of 1 or 2 mm) in relation to the cross-sectional passage area uncovered by the open valve member 22, therefore the chamber 16 of valve control 15 is also at a negative pressure value. The pressure in chamber 17 is above the atmospheric value since the turbo-compressor output is relatively low. Valve 36 is closed and no pressure leakage occurs through pipe lines 33 and 35. The force resulting from the pressure prevailing in chamber 17 and from the negative pressure in chamber 16 overcomes the force of spring 18 of valve control 15. The waste-gate 5 for shunting the exhaust gases is therefore wide open, thus reducing the counter-pressure correspondingly.

At higher engine rotational speeds and engine load values corresponding already to the fully open condition of accelerator throttle or butterfly valve 13, the venting valve 36 opens gradually as a function of the additional depression of accelerator pedal 41. The turbo-compressor 1 operates more efficiency due to the greater amount of energy available in the engine exhaust gases. The pressure in the intake manifold 12 exceeds the atmospheric value. Valve member 22 of pilot valve 21 closes the communication between the intake manifold 12 and chamber 16 of valve control 15, and this chamber 16 is restored to the atmospheric pressure due to the presence of vent hole 30. On the other hand, the pressure in chamber 17 of valve control 15 tends to decrease since the venting valve 36 opens a passage of which the cross-sectional area is subordinate to the additional depression of accelerator pedal 41, the air input penetrating into this chamber 17 being restricted by throttling device 32. When the valve 36 is fully open, the passage now available for venting to the atmosphere is greater than that provided by the throttling device 32. The pressure in chamber 17 is then at or nearly at the atmospheric pressure, due to the pressure drop occuring in the connecting pipe lines.

Since the pressure in chamber 16 is also at the atmospheric value, the coil spring 18 therein will restore the valve member 5 to its fully closed position. By properly selecting the cross-sectional passage areas of valve 36 and vent hole 30, as well as the force of spring 18 and the surface area of the diaphragm of valve control 15, it is thus possible to gradually close the exhaust gas waste-gate 5 as a function of the amount of depression of the accelerator pedal 41. The progressive closing of waste-gate 5 is attended by an increased operation of the turbo-compressor, whereby the engine power output is increased when the throttle or butterfly valve 13 is moved to its fully open position through this monitoring of the exhaust gas waste-gate 5. Moreover, during the preliminary phase consisting in moving the throttle valve 13 to its fully open position, advantage is taken of an actual supercharging pressure gain in comparison with what it would be with an open throttle under conventional operating conditions.

When the driver depresses the accelerator pedal home, for example for overtaking another vehicle (kickdown), both chambers 16 and 17 of valve control 15 are brought to the atmospheric pressure as explained in the foregoing. In this case the waste-gate 5 is fully closed and thus the maximum power output is available for the driver. The function of valve 34 adapted to close pipe line 33, comprising a stop valve 48 responsive to the antagonistic forces of a gaged spring 49 and of the air pressure output of compressor 9 via a line 50 branched off pipe line 31, is to avoid an excessive supercharging which might prove detrimental to the engine. Thus, closing valve 34 will discontinue the venting of chamber 17 to the atmosphere and the diaphragm of valve 15, responsive to the air pressure of the compressor output, will then open the exhaust gas waste-gate 5.

An increased supercharging, regardless of any increment in the fuel consumption, for example when it is desired to drive the vehicle like a sports car, may easily be added to the above-described device by inserting a switch valve adapted to be actuated at will by the driver and inserted in the pipe line 35 connecting the closing valve 34 to the venting valve 36.

This switch valve for voluntarily venting the device to the atmosphere is shown diagrammatically at 51 and may be controlled either mechanically (see arrow 52) or otherwise, for example through electromagnetic means. When this valve 51 is open, the chamber 17 is constantly kept at the atmospheric pressure and spring 18 is such that it will then restore the exhaust gas waste-gate 5 to its closed position; in other words, a supercharging relatively more important than before is obtained at the expense of an increased fuel consumption.

The supercharging device illustrated in FIG. 2 of the drawings is completely identical with that of FIG. 1, save that a valve 53 is interposed in the arrangement of FIG. 2 between chamber 17 and valve control 15 of the exhaust gas waste-gate 5, and the valve 34 for closing the pipe line 33, which is responsive to any output overpressure of compressor 9.

Valve 53 is normally open in that it normally keeps pipe line 33 open, and that the basic operation of this supercharging device is identical with the one already described in detail with reference to FIG. 1.

This additional valve 53 comprises a valve member 54 controlled through electromagnetic means, the valve shank constituting the core of a solenoid 55 normally urged by a spring 56 to its open position, i.e. off its seat 57.

In its inoperative position, the valve 54 further closes a passage 58 for venting the pipe line 33 to the atmosphere.

The solenoid 55, in this case its positive supply terminal, is connected to at least one device for detecting any abnormal engine operation, which in this example is shown in the symbolic form of a front contact 59 more particularly of the thermosensitive type adapted to close when the water in the engine cooling system exceeds a predetermined temperature. If desired, other detectors controlling the solenoid energization may be connected in parallel to the aforesaid detector when abnormal conditions develop, such as an electronic knock detector 60 consisting in the known fashion of a vibration sensor of the accelerometric or piezo-electric type fitted in the engine cylinder-head, or a detector 61 for sensing the release of noxious exhaust gases, which consists for example of a so-called lambda oxygen probe or of an electrocheminal probe acting as a carbon monoxide sensor or oxygen sensor inserted in the exhaust circuit.

Thus, at high engine speeds and loads for which the chamber 17 of valve control 15 is vented in a controlled manner to the atmosphere via valve 36, thus tending to close the exhaust gas waste-gate 5 in case any abnormal engine operation were detected, valve 54 of servo valve device 53 is attracted towards its valve seat 57 to cut off said circuit and venting in a controlled manner said chamber 17 to the atmosphere. Therefore, the pressure prevailing in chamber 17 of valve control 15 fed by compressor 9 rises and causes or increases the opening of the exhaust gas waste-gate 5, in order to reduce the engine supercharging and eliminate the detected abnormal conditions in connection therewith.

Preferably, to avoid in this case a too sudden drop in the engine power output, a passage 58 is provided for venting chamber 17 to the atmosphere by means of a valve member 54, and thus moderate the pressure increment in chamber 17 and consequently the corresponding degree of opening of the exhaust gas waste-gate 5.

This device is applicable not only in case of excessive supercharging due to certain modes of operation of the vehicle engine but also in case of misadjustment or failure of engine components (such as a faulty ignition setting, wrong fuel injection adjustment, dirty or sooted up spark plugs, and the like). In this last case, the engine is safely protected until the fault is diagnosed and the engine is fixed up.

In the first modified version illustrated in FIG. 3, an additional controlled switch valve 63 for venting the system to the atmosphere, identical with valve 51, is interposed in pipe line 19 interconnecting the monitoring valve 21 and chamber 16 of control valve 15. Switch valve 63 like valve 51 may be controlled either mechanically (see arrow 64) or electromechanically.

When the two valves 51 and 63 are not connected to the surrounding atmosphere as illustrated in FIG. 3, the complete system operates to reduce the fuel consumption, as already explained hereinabove. When in contrast thereto both valves 51 and 63 are in the opposite position after rotating in the direction of the arrows 52 and 64, respectively, to as to connect pipe lines 35 and 19 to the atmosphere, the chamber 17 is substantially at the atmospheric pressure as well as chamber 16 of valve control 15, even if the intake manifold 12 were in the negative pressure condition. In fact, pipe line 19 is no more connected to pilot valve 21.

As a result, spring 18 will restore the exhaust-gas waste-gate 5 to its closed position. Under these conditions, a relatively more pronounced supercharging is obtained at the expense of a higher fuel consumption.

In the simplified version illustrated in FIG. 4, valve 51 is dispensed with and only a single, four-way valve 65 is substituted for the two valves 51 and 63 of FIG. 3. If desired, valve 65 may be controlled either manually or electromechanically. The four-way valve 65 is inserted on the one hand in the pipe line connection 19 between pilot valve 21 and chamber 16 of valve control 15, and on the other hand in the other pipe line 66 connecting directly the venting member 36 to the other chamber 17 of valve control 15.

In the position illustrated in FIG. 4, the control valve 65 permits the passage of gas from pilot valve 21 via pipe line 19 to valve control 15. Chamber 17 communicates with venting member 36 through pipe lines 33 and 35 via protection valve 34. In this position, the complete system will thus operate under low fuel-consumption conditions as already explained in the foregoing.

When the four-way valve 65 is rotated in the direction of the arrow 67 to the position shown in FIG. 5, both chambers 16 and 17 of valve control 15 are exposed to the atmospheric pressure and the connection between pilot valve 21 and valve control 15 is discontinued. Spring 18 will thus restore the waste-gate 5 to its closed position and an increased supercharging is obtained permitting the sports-car driving of the vehicle irrespective of its load, i.e. even at low engine loads.

In the two modified versions illustrated in FIGS. 3 and 4, the protection valve 34 still protects the engine in case of excessive supercharging. In a modified form of embodiment shown in dash lines in FIGS. 3 and 4, this protection valve 34 may be controlled directly by the pressure prevailing in the intake manifold 12 via pipe line 68, and in this case pipe line 50 is dispensed with.

It will readily occur to those conversant with the art that other modifications and changes may be contemplated when carrying out the present invention into actual practice, without departing however from the basic principles of the invention.

What is claimed as new and desired to be secured by Letters Patent of the United States is:

1. A turbo-compressor supercharging device for an internal combustion engine having an engine intake manifold, an engine exhaust manifold and an engine intake butterfly valve controlled by a butterfly control means having a maximum stroke exceeding a fully open position of said butterfly valve, said turbo-compressor supercharging device comprising:
   a turbine driven by engine exhaust gases;
   an air compressor driven by said turbine and connected to said engine intake manifold;
   an exhaust gas waste gate associated with said exhaust manifold;
   a valve control assembly connected to said waste gate for controlling a position of said waste gate, said valve control assembly including a first control portion and a second control portion, said valve control assembly being actuated by a pressure differential between said first and second control portions;
   a pilot valve connected to a source of engine intake manifold pressure and responsive to a negative intake manifold pressure signal to supply said intake manifold pressure to said first control portion;
   first conduit means supplying compressor output pressure to said second control portion; and
   a vent valve connected by second conduit means to said second control portion for venting said second control portion to the atmosphere, said vent valve being actuatable in response to a butterfly control means stroke exceeding said fully open butterfly valve position,
   whereby a position of said waste gate is controlled, when said butterfly control means stroke exceeds said fully open butterfly position, by a degree of said vent valve venting said second control portion.

2. The supercharging device of claim 1, wherein said pilot valve is of the differential type operating between a negative pressure and the atmospheric pressure.

3. The supercharging device of claim 1 or 2 including a four way valve of the on-or-off type, said four way valve being interposed in a third conduit means connecting said pilot valve and said first control portion and selectively connecting said third conduit means to the atmosphere and to a fourth conduit means connected to said second conduit means.

4. The supercharging device of claims 1 or 2, wherein there is inserted, in said second conduit means, a first normally open valve adapted to close so as to close said second conduit responsive to a predetermined maximum output pressure of said compressor, whereby said valve control, when said second conduit is closed, can open said waste-gate to restrict the supercharging pressure.

5. The supercharging device of claim 4, wherein a first venting member of the on-or-off type is interposed between said first normally open valve and said venting member for obtaining a higher degree of supercharging when desired.

6. The supercharging device of, claim 4, wherein said second conduit means includes a second normally open valve responsive to at least one device for detecting any abnormal engine operation, said second normally open valve being responsive to said at least one device for closing said second conduit means whereby said waste-gate remains open for reducing fuel consumption.

7. The supercharging device of claim 6, wherein said second normally open valve includes a vent means and is adapted, when in a position corresponding to a closed condition of said second conduit means to open said vent means for the predetermined venting to the atmosphere of said second control portion.

8. The supercharging device of claims 6, wherein said second normally open valve is interposed between said first normally open valve and said valve control assembly.

9. The supercharging device of claims 6 wherein said second normally open valve is controlled through electromagnetic means, and said at least one device is of the electrical response type.

10. The supercharging device of claim 9, wherein said at least one device includes an electric thermosensitive switch device responsive to an over heated engine condition.

11. The supercharging device of claim 9, wherein said at least one device includes an electronic engine knock detector.

12. The supercharging device of claim 9, wherein said at least one device is constructed so as to be capable of detecting the release of noxious exhaust gases.

13. The supercharging device of claim 5, wherein a second on-or-off venting member is interposed between said valve control assembly and said pilot valve in order to ensure a higher degree of supercharging irrespective of the internal combustion engine load.

14. The supercharging device of claim 1, wherein a first normally open valve is interposed in said second conduit means, said first normally open valve being responsive in the closing direction to a predetermined maximum pressure prevailing in the engine intake manifold.

* * * * *